United States Patent
Amler et al.

(10) Patent No.: US 12,386,809 B2
(45) Date of Patent: Aug. 12, 2025

(54) MULTI-FRAGMENT INDEX SCAN

(71) Applicant: SAP SE, Walldorf (DE)

(72) Inventors: Andreas Amler, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/591,568

(22) Filed: Feb. 29, 2024

(65) Prior Publication Data

US 2024/0256514 A1    Aug. 1, 2024

Related U.S. Application Data

(63) Continuation of application No. 17/750,841, filed on May 23, 2022, now Pat. No. 11,960,463.

(51) Int. Cl.
*G06F 16/22* (2019.01)
*G06F 16/2455* (2019.01)

(52) U.S. Cl.
CPC ........ *G06F 16/2282* (2019.01); *G06F 16/221* (2019.01); *G06F 16/2228* (2019.01); *G06F 16/24556* (2019.01)

(58) Field of Classification Search
CPC .............. G06F 16/221; G06F 16/2282; G06F 16/2228; G06F 16/24556; G06F 16/2425
See application file for complete search history.

(56) References Cited

U.S. PATENT DOCUMENTS

| 10,664,474 | B1 * | 5/2020 | Chunduru | G06F 16/24544 |
| 11,782,924 | B2 * | 10/2023 | Delbru | G06F 16/2456 |
| | | | | 707/714 |
| 2019/0220464 | A1 * | 7/2019 | Butani | G06F 16/248 |
| 2020/0073986 | A1 * | 3/2020 | Purcell | G06F 16/21 |
| 2022/0335086 | A1 * | 10/2022 | Chen | G06F 16/90344 |
| 2023/0205760 | A1 * | 6/2023 | McHugh | G06F 16/2255 |
| | | | | 707/696 |

* cited by examiner

*Primary Examiner* — Dangelino N Gortayo
(74) *Attorney, Agent, or Firm* — Mintz Levin Cohn Ferris Glovsky and Popeo, P.C.

(57) ABSTRACT

A method for performing a multi-fragment index scan operation included in a query pipeline of a query accessing a database table may include performing an index scan on a first chunk of a first fragment of the database table and a second chunk of a second fragment of the database table. A first output of the index scan on the first chunk of the first fragment of the database table and a second output of the index scan on the second chunk of the second fragment of the database table may be merged to generate a partial result set for ingestion by a next operation in the query pipeline. The multi-fragment index scan operation may continue with index scans on subsequent chunks of the first fragment and second fragment of the database table. Related systems and computer program products are also provided.

20 Claims, 6 Drawing Sheets

195

Partition 165a

| A | B |
|---|---|
| 10 | 649148601 |
| 86 | 596001601 |
| 52 | 129627 |
| ... | ... |

Partition 165b

| A | B |
|---|---|
| 100 | 968 |
| 198 | 306820681 |
| 125 | 77789 |
| ... | ... |

Partition 165c

| A | B |
|---|---|
| 206 | 60860108 |
| 100390 | 14 |
| 4067 | 130068701 |
| ... | ... |

MULTI-FRAGMENT INDEX SCAN

CROSS REFERENCE TO RELATED APPLICATIONS

This application is a continuation of application Ser. No. 17/750,841 filed May 23, 2022, entitled "MULTI-FRAGMENT INDEX SCAN." The disclosure of which is incorporated herein by reference in its entirety.

TECHNICAL FIELD

The subject matter described herein relates generally to database processing and more specifically to a multi-fragment index scan operation for fetching data from a database table.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for multi-fragment index scan. In some example embodiments, there is provided a system that includes at least one processor and at least one memory. The at least one memory may include program code that provides operations when executed by the at least one processor. The operations may include: performing a multi-fragment index scan operation included in a query pipeline of a query accessing a database table, the multi-fragment index scan being performed by at least performing an index scan on a first chunk of a first fragment of the database table and a second chunk of a second fragment of the database table; and generating, for ingestion by a next operation in the query pipeline, a first partial result set by at least merging a first output of the index scan on the first chunk of the first fragment of the database table and a second output of the index scan on the second chunk of the second fragment of the database table.

In some variations, one or more features disclosed herein including the following features can optionally be included in any feasible combination. The operations may further include: continuing to perform the multi-fragment scan operation by at least performing the index scan on a third chunk of the first fragment of the database table and a fourth chunk of the second fragment of the database table; and generating, for ingestion by the next operation in the query pipeline, a second partial result set by at least merging a third output of the index scan on the third chunk of the first fragment of the database table and a fourth output of the index scan on the fourth chunk of the second fragment of the database table.

In some variations, the operations may further include: passing, onto the next operation in the query pipeline, the first partial result set and the second partial result set.

In some variations, the index scan may be performed by at least generating, based at least on a dictionary mapping one or more unique data values occupying a dictionary-compressed column of the database table to one or more corresponding value identifiers, a value identifier set in which each value identifier is ordered in accordance with a corresponding data value, and performing an index lookup to retrieve a row position of each value identifier included in the value identifier set.

In some variations, the operations may further include: assigning, to a first worker thread, a first range of data values from the dictionary such that the first worker thread processes the first range of data values across the first fragment and the second fragment of the database table; and assigning, to a second worker thread, a second range of data values from the dictionary such that the second worker thread processes the second range of data values across the first fragment and the second fragment of the database table.

In some variations, the first worker thread may process the first range of data values in parallel with the second worker thread processing the second range of data values.

In some variations, the operations may further include: omitting, based at least on at least one data value excluded by a filter imposed on the multi-fragment index scan operation, one or more corresponding value identifiers from the index lookup.

In some variations, the multi-fragment index scan operation may be performed to identify a k quantity of smallest data values or a k quantity of largest data values in a column of the database table.

In some variations, the multi-fragment index scan operation may be performed to identify a k quantity of smallest data values or a k quantity of largest data values starting from an n-th data value in a column of the database table.

In some variations, the operations may further include: buffering the first output of the index scan on the first chunk of the first fragment of the database table and the second output of the index scan on the second chunk of the second fragment of the database table; and generating the first partial result set by merging the buffered first output and second output.

In some variations, each of the first fragment and the second fragment may be a main fragment or a delta fragment of a same partition or different partitions of the database table.

In some variations, the delta fragment may be a first delta fragment configured to hold new data values between periodic delta merge operations and/or a second delta fragment configured to hold new data values during a delta merge operation.

In another aspect, there is provided a method for multi-fragment index scan. The method may include: performing a multi-fragment index scan operation included in a query pipeline of a query accessing a database table, the multi-fragment index scan being performed by at least performing an index scan on a first chunk of a first fragment of the database table and a second chunk of a second fragment of the database table; and generating, for ingestion by a next operation in the query pipeline, a first partial result set by at least merging a first output of the index scan on the first chunk of the first fragment of the database table and a second output of the index scan on the second chunk of the second fragment of the database table.

In some variations, one or more features disclosed herein including the following features can optionally be included in any feasible combination. The method may further include: continuing to perform the multi-fragment scan operation by at least performing the index scan on a third chunk of the first fragment of the database table and a fourth chunk of the second fragment of the database table; generating, for ingestion by the next operation in the query pipeline, a second partial result set by at least merging a third output of the index scan on the third chunk of the first fragment of the database table and a fourth output of the index scan on the fourth chunk of the second fragment of the database table; and passing, onto the next operation in the query pipeline, the first partial result set and the second partial result set.

In some variations, the index scan may be performed by at least generating, based at least on a dictionary mapping one or more unique data values occupying a dictionary-compressed column of the database table to one or more corresponding value identifiers, a value identifier set in which each value identifier is ordered in accordance with a corresponding data value, and performing an index lookup to retrieve a row position of each value identifier included in the value identifier set.

In some variations, the method may further include: assigning, to a first worker thread, a first range of data values from the dictionary such that the first worker thread processes the first range of data values across the first fragment and the second fragment of the database table; and assigning, to a second worker thread, a second range of data values from the dictionary such that the second worker thread processes the second range of data values across the first fragment and the second fragment of the database table, the second worker thread processing the second range of data values in parallel with the first worker thread processing the first range of data values.

In some variations, the method may further include: omitting, based at least on at least one data value excluded by a filter imposed on the multi-fragment index scan operation, one or more corresponding value identifiers from the index lookup.

In some variations, the multi-fragment index scan operation may be performed to identify a k quantity of smallest data values or a k quantity of largest data values starting from an n-th data value in a column of the database table.

In some variations, each of the first fragment and the second fragment may be a main fragment or a delta fragment of a same partition or different partitions of the database table. The delta fragment may be a first delta fragment configured to hold new data values between periodic delta merge operations and/or a second delta fragment configured to hold new data values during a delta merge operation.

In another aspect, there is provided a computer program product including a non-transitory computer readable medium storing instructions. The instructions may cause operations may executed by at least one data processor. The operations may include: performing a multi-fragment index scan operation included in a query pipeline of a query accessing a database table, the multi-fragment index scan being performed by at least performing an index scan on a first chunk of a first fragment of the database table and a second chunk of a second fragment of the database table; and generating, for ingestion by a next operation in the query pipeline, a first partial result set by at least merging a first output of the index scan on the first chunk of the first fragment of the database table and a second output of the index scan on the second chunk of the second fragment of the database table.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a multi-fragment index scan operation to fetch data from a database table, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
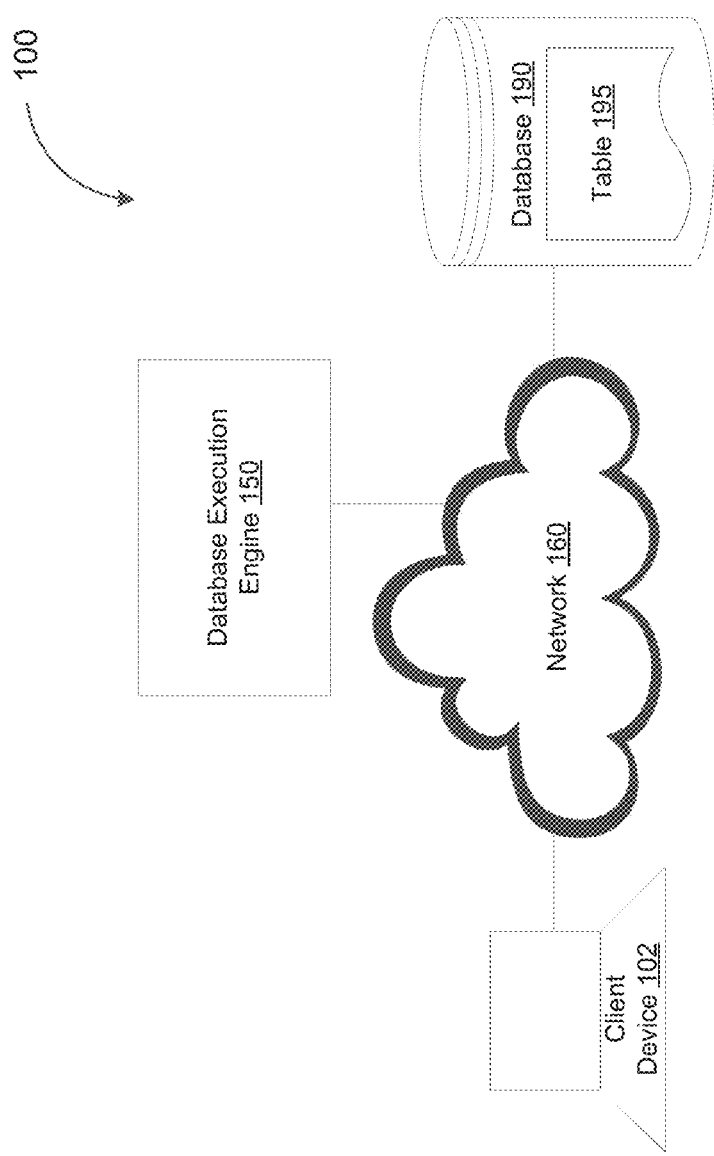
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution.

In such a parallelization framework, a database execution engine may divide a query accessing a dataset (e.g., including one or more database tables) into a quantity of tasks determined based on the quantity of time required to execute the query on a portion the dataset having a predetermined size. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads) to determine whether to increase that initial quantity of worker threads. That is, if the database execution engine detects an insufficient progress, the database execution engine may allocate additional worker threads to perform the tasks associated with the query.

In cases where the query requires a sequential read of data values from the dictionary-compressed column of a database table, the corresponding query pipeline may include an index scan operation to fetch data from the database table in an order specified by a pre-existing index. The database execution engine may perform the index scan operation by generating, based at least on a dictionary mapping unique data values in the column to one or more corresponding value identifiers, a value identifier set in which each value identifier is ordered in accordance with the corresponding data values. Moreover, the database execution engine may perform the index scan operation performing an index lookup to retrieve the row positions of each value identifier in the value identifier set. The next operation in the query pipeline may ingest either the row positions of each value identifier in the value identifier set or the corresponding data values.

In cases where each partition of the database table is associated with multiple fragments, such as a main fragment and one or more delta fragments to hold new data values in between periodic delta merge operations, a conventional fragment-local index scan operation is performed on each fragment of the database table individually. Doing so generates separate result streams (e.g., one result stream for each fragment of the database table), which are then merged to produce a single result stream for ingestion by the next operation in the query pipeline. However, this merge operation, which requires buffering and materializing every output data value at once, may impose significant computational overhead. As such, in some example embodiments, instead of the conventional fragment-local index scan operation, the database execution engine may perform a multi-fragment index scan operation. Accordingly, instead of operating on each fragment of the database table separately and performing a merge operation to generate the full result set, the multi-fragment index scan operation may be performed on a chunk of every fragment of the database table at a time before an ad-hoc merge operation is performed to generate a partial result set. Doing so may avoid the computationally expensive merge operation associated with the conventional fragment-local index scan operation. Moreover, the multi-fragment index scan operation may leverage the aforementioned parallelization framework, for example, by assigning each worker thread performing the multi-fragment scan operation a portion of the dictionary (e.g., one of the multiple equally-sized data value ranges from the dictionary).

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
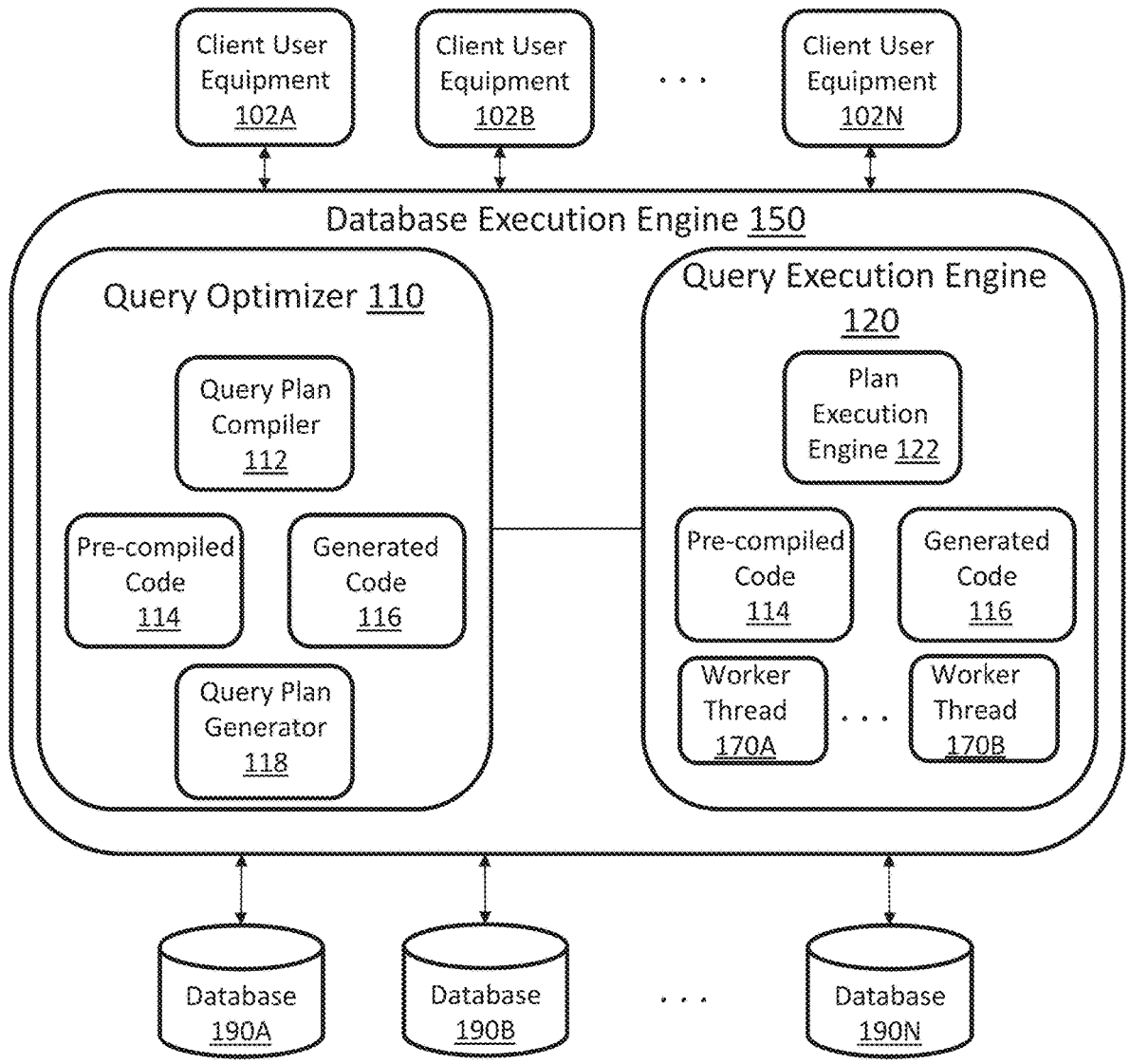
FIG. 2 depicts a block diagram illustrating an example of a database execution engine, in accordance with some example embodiments.

FIG. 2 depicts a block diagram illustrating an example of the database execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the database execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multi-dimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

Figure 3A:
FIG. 3A depicts an example of a database table with multiple partitions, in accordance with some example embodiments.

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 150 may divide the database table 195 into multiple partitions by applying one or more of a hash partitioning, round-robin partitioning, and range partitioning. For example, as shown in FIG. 3A, the database table 195 may be divided into a first partition 165a, a second partition 165b, and a third partition 165c. Moreover, the first partition 165a may be stored at the first database 190A, the second partition 165b may be stored at the second database 190B, and the third partition 165c may be stored at the third database 190C.

To execute a query accessing a dataset that includes, for example, the database table 195, the database execution engine 150 may divide the query into a quantity of tasks determined based on the quantity of time required to execute the query on a portion the dataset having a predetermined size. Accordingly, if a large quantity of time is required to execute the query on the portion of the dataset, the database execution engine 150 may determine that the query is computationally intensive and thus divide the query into a larger quantity of smaller tasks. One or more of the worker threads 170 (e.g., a first worker thread 170A, a second worker thread 170B, and/or the like) may be allocated to perform the tasks associated with the query. The quantity of the worker threads 170 the database execution engine 150 allocates may be determined based on the progress of the query observed at various time intervals. For example, upon allocating an initial quantity of the worker threads 170 to perform the tasks associated with the query, the database execution engine 150 may monitor the progress of the query (e.g., the quantity of tasks that have not been performed by any the worker threads 170) to determine whether to increase that initial quantity of the worker threads 170.

In cases where the query requires a sequential read of data values from a dictionary-compressed column of the database table 195, the corresponding query pipeline may include an index scan operation to fetch data from the database table 195 in an order specified by a pre-existing index. For example, the database execution engine 150 may perform the index scan operation to generate, for ingestion by a next operation in the query pipeline, the row positions of each value identifier in a dictionary ordered by the data values occupying the dictionary compressed column or the corresponding data values.

In some example embodiments, each partition 165 of the database table 195 may be associated with multiple fragments, including a main fragment, a first delta fragment for holding new data between periodic delta merge operations during which data is transferred from the first delta fragment to the main fragment, and a second delta fragment for receiving new data during each delta merge operation. A conventional fragment-local index scan operation, which is performed on each fragment of the database table individually, may impose significant computational overhead because the separate result streams for each fragment of the database table 195 are eventually merged to produce a single result stream for ingestion by the next operation in the query pipeline. Accordingly, instead of the conventional fragment-local index scan operation, the database execution engine 150 may perform a multi-fragment index scan operation. Whereas the conventional fragment-local index scan operation operates on each fragment of the database table 195 separately and performs a merge operation to generate the result set in its entirety, the multi-fragment index scan operation may be performed on a chunk of every fragment of the database table at a time before an ad-hoc merge operation is performed to generate a partial result set. Because the multi-fragment index scan operation may be performed without buffering and materializing every output data value at once, the multi-fragment index scan operation imposes significantly less computational overhead than the conventional fragment-local index scan operation.

In some example embodiments, the database execution engine 150 may perform the multi-fragment index scan operation by performing an index scan operation on multiple fragments of the database table 195 at a time. For example, at any given time, the database execution engine 150 may perform the index scan operation on a first chunk of a first fragment of the database table 195 and a second chunk of a second fragment of the database table 195. Each index scan operation may include generating, based at least on a dictionary mapping unique data values in a dictionary-compressed column of the database table 195 to one or more corresponding value identifiers, a value identifier set in which each value identifier is ordered in accordance with the corresponding data values. Moreover, each index scan operation may include an index lookup to retrieve the row positions of each value identifier in the value identifier set. The index scan results from the first chunk of the first fragment of the database table 195 and the second chunk of the second fragment of the database table 195 may be buffered until a merge operation is performed to generate a first partial result set.

Once the database execution engine 150 merges the results from the first chunk of the first fragment of the database table 195 and the second chunk of the second fragment of the database table 195 to generate the first partial result set, the first partial result set may be passed onto the next operation in the query pipeline. Moreover, the database execution engine 150 may continue to perform the multi-fragment index scan operation on subsequent chunks of the first fragment of the database table 195 and the second fragment of the database table 195. For example, the index scan results from the subsequent chunks of the first fragment and second fragment of the database table 195 may be held in the buffer until another merge operation is performed to form a second partial result set for ingestion by the next operation in the query pipeline.

Figure 3B:
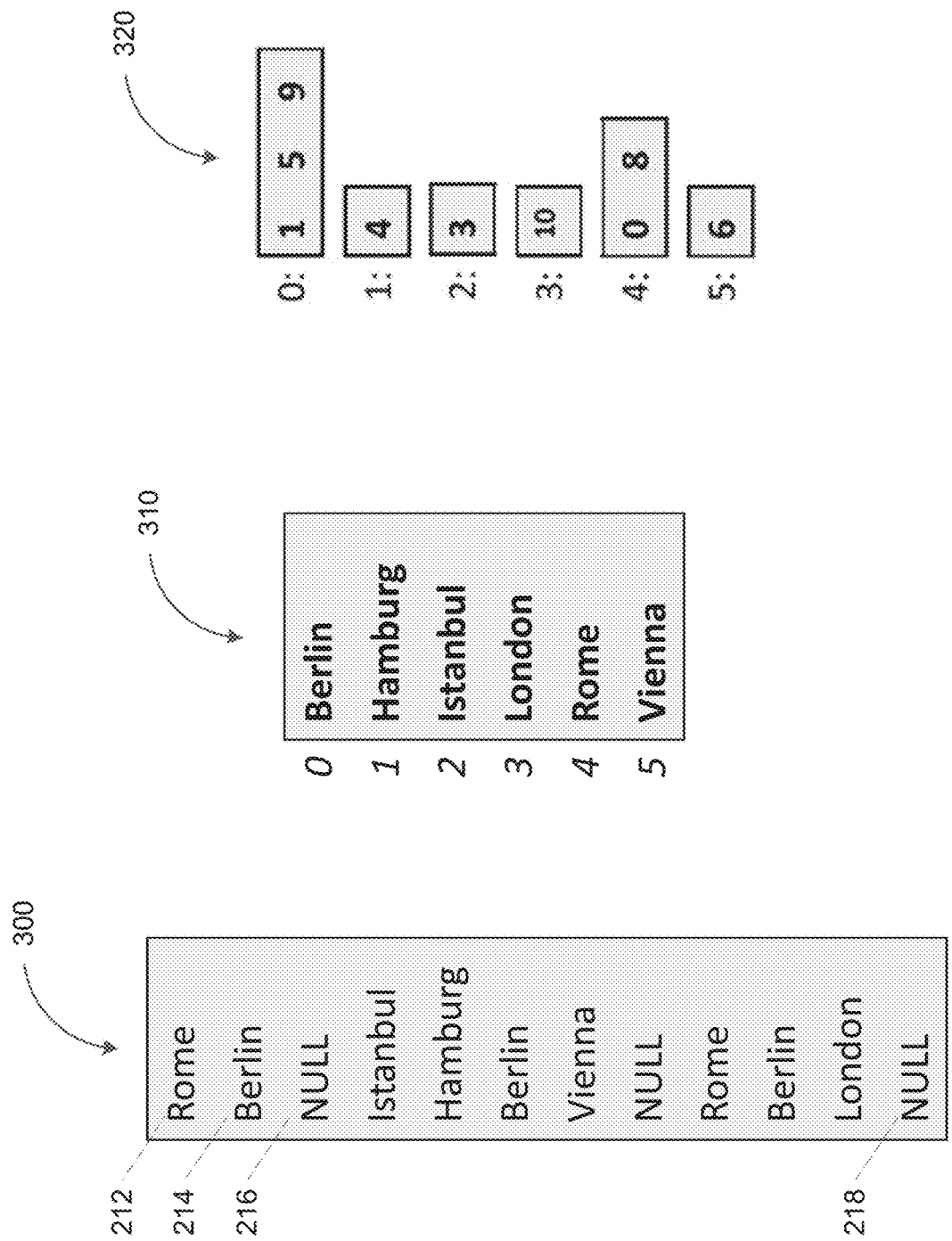
FIG. 3B depicts an example of a data column along with a corresponding dictionary and index, in accordance with some example embodiments.

To further illustrate, FIG. 3B depicts an example of a column 300 from the database table 195 along with a corresponding dictionary 310 and index 320, in accordance with some example embodiments. As shown in FIG. 3B, the data values occupying the column 300 of the database table 195 may be compressed based on the mappings between data values and value identifiers provided by the dictionary 310. Accordingly, instead of storing the actual data values shown in FIG. 3B, the column 300 of the database table 195 may be stored as a sequence of corresponding value identifiers. In some cases, in order to support the aforementioned index scan operations, the database execution engine 150 may generate the index 320 which, as shown in FIG. 3B, enumerates the row position of each value identifier included in the dictionary 310. For instance, as shown in FIG. 3B, the index 320 indicates that the value identifier "0," which is mapped to the data value "Berlin," appears in rows 1, 5 and 9 of the column 300. Furthermore, the index 320 indicates that the value identifier "1," which is mapped to the data value "Hamburg," appears in row 4 of the data vector 230. Performing an index scan on the column 300 of the database table 195 may generate an output that includes, for example, the row positions of the value identifier "0" or the corresponding data value "Berlin" (once for each of the row positions 1 and 9).

As noted, in some example embodiments, the multi-fragment index scan operation may include generating partial index scan results for corresponding chunks of every fragment of the database table 195. Moreover, in some example embodiment, the multi-fragment index scan operation may leverage the parallelization framework, for example, by assigning each worker thread 170 performing the multi-fragment scan operation a portion of the dictionary 310 (e.g., one of the multiple equally-sized data value ranges from the dictionary 310). For example, the first worker thread 170A may be assigned a first range of data values from the dictionary 310 while the second worker thread 170B may be assigned a second range of data values from the dictionary 310. It should be appreciated that each worker thread 170 may be assigned different and non-overlapping portions of the dictionary 310. Doing so may ensure that the partial result sets being merged during the multi-fragment index scan operation are associated with the same portion of the database table 195 (e.g., the same data value ranges from across the different fragments of the database table 195). Moreover, each worker thread 170 may operate independently on the same assigned portion of the dictionary 310 across all fragments of the database table 195 with the merging of the partial result sets from each fragment of the database table 195 being performed independently of one another.

In some example embodiments, the multi-fragment index scan operation may be combined with one or more filters. For example, when generating the value identifier set, the database execution engine 150 may omit, based at least on the data values excluded by the one or more filters, one or more corresponding value identifiers from the subsequent index lookup. Alternatively and/or additionally, the multi-fragment index scan operation may be performed to identify one or more of a k-quantity of the smallest data values or largest data values in the column 300 of the database table 195 (e.g., a top k query, a bottom k query, and/or the like). This is because the output of the dictionary and index lookups is ordered in accordance with the data values. Accordingly, the k-quantity of the smallest data values in the column 300 of the database table 195 may correspond to the first k data values in the output of the multi-fragment index scan operation while the k-quantity of the largest data values in the column 300 of the database table 195 may correspond to the last k data values in the output of the multi-fragment index scan operation. In some cases, the database execution engine 150 may continue to perform the multi-fragment index scan operation until it has accumulated the k-quantity of data values.

In some cases, the aforementioned top k query may be associated with an offset n such that the top k query returns a k quantity of the smallest data values in the column 300 of the database table 195 starting from the n-th data value. Similarly, when a bottom k query is associated with an offset n, the output is a k quantity of the largest data values starting from the n-th data value. For example, when that offset n is zero, the top k query may return a k quantity of the smallest data values in the column 300. Alternatively, if the offset n is two, the top k query may return a k quantity of the smallest data values starting from the third data value. To execute a top k query with an offset n, the database execution engine 150 may continue to perform the multi-fragment index scan operation until it has accumulated a (k+n) quantity of data values from the column 300 of the database table 195. Moreover, the database execution engine 150 may exclude, from the result of the multi-fragment index scan operation, the first n data values. Instead, the result of the top k query with the offset n may include a k quantity of the smallest data value after the n-th data value.

Figure 4:
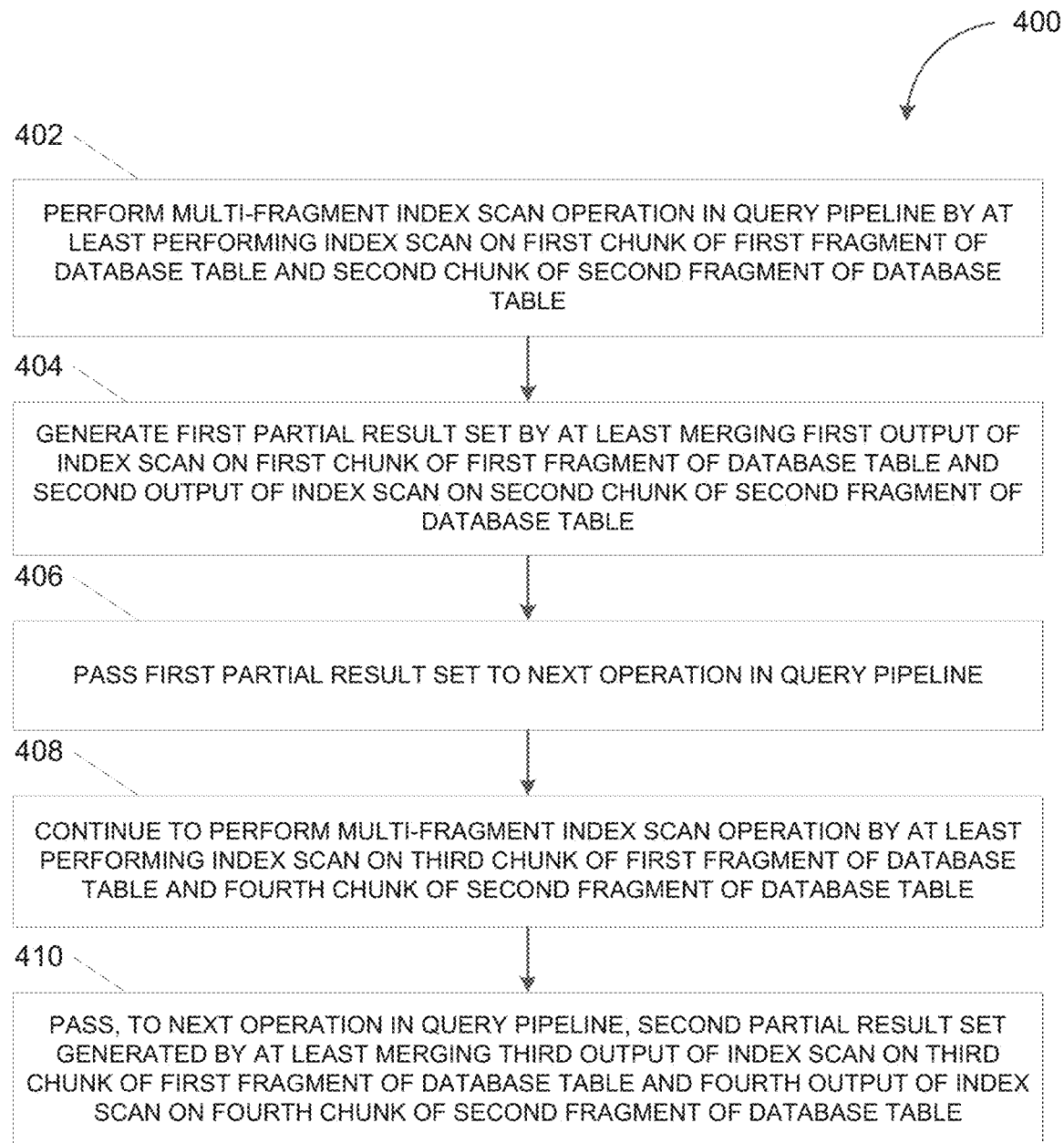
FIG. 4 depicts a flowchart illustrating an example of a process for multi-fragment index scan, in accordance with some example embodiments.

FIG. 4 depicts a flowchart illustrating an example of a process 400 for multi-fragment index scan, in accordance with some example embodiments. Referring to FIGS. 1-4, the process 400 may be performed by the database execution engine 150 in order to execute a query accessing the database table 195 stored at the one or more databases 190. The query may require a sequential read of data values from a dictionary-compressed column of the database table 195, in which case the corresponding query pipeline may include a multi-fragment index scan operation configured to generate partial index scan results for corresponding chunks of every fragment of the database table 195.

At 402, the database execution engine 150 may perform a multi-fragment index scan operation in a query pipeline by at least performing an index scan on a first chunk of a first fragment of a database table and a second chunk of a second fragment of the database table. In some example embodiments, the database execution engine 150 performing the multi-fragment index scan operation on the dictionary-compressed column 300 of the database table 195 may generate partial index scan results for corresponding chunks of every fragment of the database table 195. Accordingly, the database execution engine 150 may perform an index scan on a first chunk of a first fragment of the database table 195 and a second chunk of a second fragment of the database table 195. For example, each index scan operation may include generating, based at least on a dictionary mapping unique data values in a dictionary-compressed column of the database table 195 to one or more corresponding value identifiers, a value identifier set in which each value identifier is ordered in accordance with the corresponding data values. Moreover, each index scan operation may include an index lookup to retrieve the row positions of each value identifier in the value identifier set. The index scan results from the first chunk of the first fragment of the database table 195 and the second chunk of the second fragment of the database table 195 may be buffered until a merge operation is performed to generate a first partial result set.

At 404, the database execution engine 150 may generate a first partial result set by at least merging a first output of the index scan on the first chunk of the first fragment of the database table and a second output of the index scan on the second chunk of the second fragment of the database table. For example, the database execution engine 150 may merge the buffered index scan results from the first chunk of the first fragment of the database table 195 and the second chunk of the second fragment of the database table 195 to generate a first partial result set.

At 406, the database execution engine 150 may pass the first partial result set to a next operation in the query pipeline. For example, once the database execution engine 150 merges the results from the first chunk of the first fragment of the database table 195 and the second chunk of the second fragment of the database table 195 to generate the first partial result set, the database execution engine 150 may pass the first partial result set onto the next operation in the query pipeline.

At 408, the database execution engine 150 may continue to perform the multi-fragment index scan operation by at least performing the index scan operation on a third chunk of the first fragment of the database table and a fourth chunk of the second fragment of the database table. In some example embodiments, the database execution engine 150 may continue to perform the multi-fragment index scan operation on subsequent chunks of the first fragment of the database table 195 and the second fragment of the database table 195. For example, the database execution engine 150 may continue to perform the multi-fragment index scan operation by at least performing an index scan on a third chunk of the first fragment of the database table 195 and a fourth chunk of the second fragment of the database table 195. The index scan results from the third chunk of the first fragment of the database table 195 and the fourth chunk of the second fragment of the database table 195 may again be buffered until the database execution engine 150 performs a merge operation to generate a second partial result set.

At 410, the database execution engine 150 may pass, to the next operation in the query pipeline, a second partial result set generated by at least merging a third output of the index scan on the third chunk of the first fragment of the database table and a fourth output of the index scan on the fourth chunk of the second fragment of the database table. For example, the database execution engine 150 may merge the buffered index scan results from the third chunk of the first fragment of the database table 195 and the fourth chunk of the second fragment of the database table 195 to generate the second partial result set. Moreover, the database execution engine 150 may pass the second partial result set onto the next operation in the query pipeline. It should be appreciated that the database execution engine 150 may continue to perform the process 400 on one or more subsequent chunks of the fragments of the database table 195 until the database execution engine 150 has processed every remaining chunk.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: performing a multi-fragment index scan operation included in a query pipeline of a query accessing a database table, the multi-fragment index scan being performed by at least performing an index scan on a first chunk of a first fragment of the database table and a second chunk of a second fragment of the database table; and generating, for ingestion by a next operation in the query pipeline, a first partial result set by at least merging a first output of the index scan on the first chunk of the first fragment of the database table and a second output of the index scan on the second chunk of the second fragment of the database table.

Example 2: The system of Example 1, wherein the operations further comprise: continuing to perform the multi-fragment scan operation by at least performing the index scan on a third chunk of the first fragment of the database table and a fourth chunk of the second fragment of the database table; and generating, for ingestion by the next operation in the query pipeline, a second partial result set by at least merging a third output of the index scan on the third chunk of the first fragment of the database table and a fourth output of the index scan on the fourth chunk of the second fragment of the database table.

Example 3: The system of Example 2, wherein the operations further comprise: passing, onto the next operation in the query pipeline, the first partial result set and the second partial result set.

Example 4: The system of any one of Examples 1 to 3, wherein the index scan is performed by at least generating, based at least on a dictionary mapping one or more unique data values occupying a dictionary-compressed column of the database table to one or more corresponding value identifiers, a value identifier set in which each value identifier is ordered in accordance with a corresponding data value, and performing an index lookup to retrieve a row position of each value identifier included in the value identifier set.

Example 5: The system of Example 4, wherein the operations further comprise: assigning, to a first worker thread, a first range of data values from the dictionary such that the first worker thread processes the first range of data values across the first fragment and the second fragment of the database table; and assigning, to a second worker thread, a second range of data values from the dictionary such that the second worker thread processes the second range of data values across the first fragment and the second fragment of the database table.

Example 6: The system of Example 5, wherein the first worker thread processes the first range of data values in parallel with the second worker thread processing the second range of data values.

Example 7: The system of any one of Examples 4 to 6, wherein the operations further comprise: omitting, based at least on at least one data value excluded by a filter imposed on the multi-fragment index scan operation, one or more corresponding value identifiers from the index lookup.

Example 8: The system of any one of Examples 1 to 7, wherein the multi-fragment index scan operation is performed to identify a k quantity of smallest data values or a k quantity of largest data values in a column of the database table.

Example 9: The system of any one of Examples 1 to 8, wherein the multi-fragment index scan operation is performed to identify a k quantity of smallest data values or a k quantity of largest data values starting from an n-th data value in a column of the database table.

Example 10: The system of any one of Examples 1 to 9, wherein the operations further comprise: buffering the first output of the index scan on the first chunk of the first fragment of the database table and the second output of the index scan on the second chunk of the second fragment of the database table; and generating the first partial result set by merging the buffered first output and second output.

Example 11: The system of any one of Examples 1 to 10, wherein each of the first fragment and the second fragment comprises a main fragment or a delta fragment of a same partition or different partitions of the database table.

Example 12: The system of Example 11, wherein the delta fragment comprises a first delta fragment configured to hold new data values between periodic delta merge operations and/or a second delta fragment configured to hold new data values during a delta merge operation.

Example 13: A method, comprising: performing a multi-fragment index scan operation included in a query pipeline of a query accessing a database table, the multi-fragment index scan being performed by at least performing an index scan on a first chunk of a first fragment of the database table and a second chunk of a second fragment of the database table; and generating, for ingestion by a next operation in the query pipeline, a first partial result set by at least merging a first output of the index scan on the first chunk of the first fragment of the database table and a second output of the index scan on the second chunk of the second fragment of the database table.

Example 14: The method of Example 13, further comprising: continuing to perform the multi-fragment scan operation by at least performing the index scan on a third chunk of the first fragment of the database table and a fourth chunk of the second fragment of the database table; generating, for ingestion by the next operation in the query pipeline, a second partial result set by at least merging a third output of the index scan on the third chunk of the first fragment of the database table and a fourth output of the index scan on the fourth chunk of the second fragment of the database table; and passing, onto the next operation in the query pipeline, the first partial result set and the second partial result set.

Example 15: The method of any one of Examples 13 to 14, wherein the index scan is performed by at least generating, based at least on a dictionary mapping one or more unique data values occupying a dictionary-compressed column of the database table to one or more corresponding value identifiers, a value identifier set in which each value identifier is ordered in accordance with a corresponding data value, and performing an index lookup to retrieve a row position of each value identifier included in the value identifier set.

Example 16: The method of Example 15, further comprising: assigning, to a first worker thread, a first range of data values from the dictionary such that the first worker thread processes the first range of data values across the first fragment and the second fragment of the database table; and assigning, to a second worker thread, a second range of data values from the dictionary such that the second worker thread processes the second range of data values across the first fragment and the second fragment of the database table, the second worker thread processing the second range of data values in parallel with the first worker thread processing the first range of data values.

Example 17: The method of any one of Examples 15 to 16, further comprising: omitting, based at least on at least one data value excluded by a filter imposed on the multi-fragment index scan operation, one or more corresponding value identifiers from the index lookup.

Example 18: The method of any one of Examples 13 to 17, wherein the multi-fragment index scan operation is performed to identify a k quantity of smallest data values or a k quantity of largest data values starting from an n-th data value in a column of the database table.

Example 19: The method of any one of Examples 13 to 18, wherein each of the first fragment and the second fragment comprises a main fragment or a delta fragment of a same partition or different partitions of the database table, and wherein the delta fragment comprises a first delta fragment configured to hold new data values between periodic delta merge operations and/or a second delta fragment configured to hold new data values during a delta merge operation.

Example 20: A non-transitory computer readable medium storing instructions, which when executed by at least one data processor, result in operations comprising: performing a multi-fragment index scan operation included in a query pipeline of a query accessing a database table, the multi-fragment index scan being performed by at least performing an index scan on a first chunk of a first fragment of the database table and a second chunk of a second fragment of the database table; and generating, for ingestion by a next operation in the query pipeline, a first partial result set by at least merging a first output of the index scan on the first chunk of the first fragment of the database table and a second output of the index scan on the second chunk of the second fragment of the database table.

Figure 5:
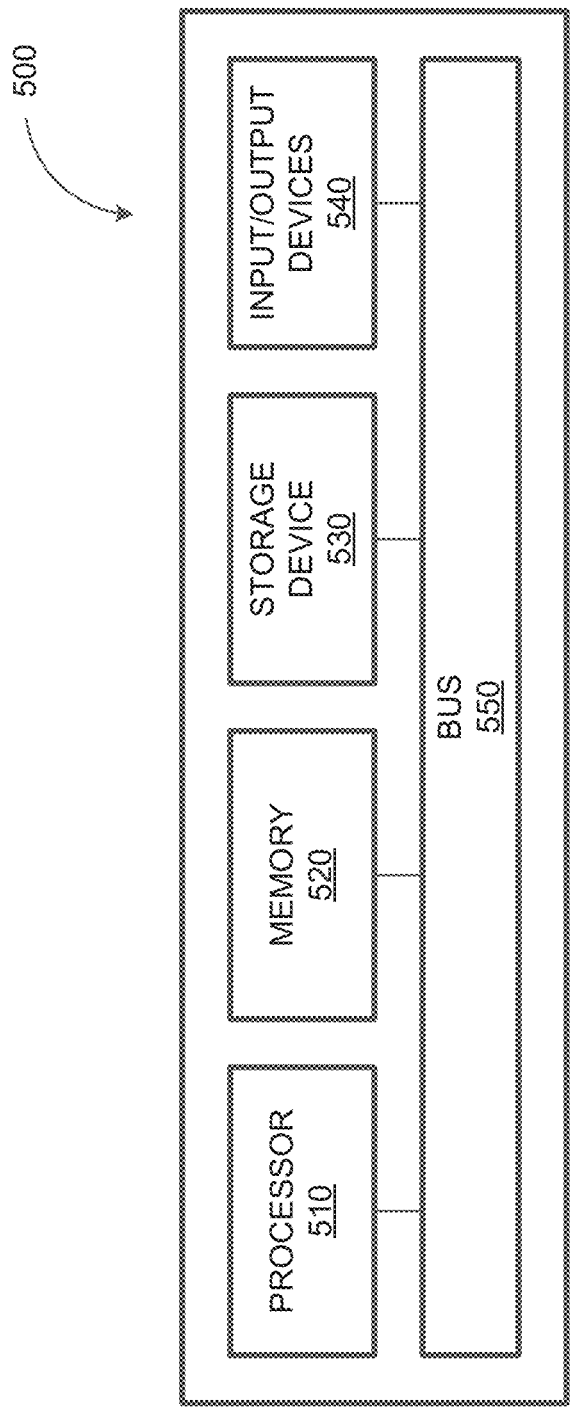
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the database execution engine 150 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
     performing, on each fragment of a plurality of fragments of a database table, a multi-fragment index scan operation using a chunk-at-a-time on each of the fragments of the plurality of fragments, wherein the multi-fragment index scan operation using the chunk-at-a-time generates at least a first chunk of a first fragment of the plurality of fragments and a second chunk of the second fragment of the plurality of fragments;
     merging a plurality of partial results output from the multi-fragment index scan operation performed on at least the first chunk of the first fragment of the plurality of fragments and the second first chunk of the second fragment of the plurality of fragments to generate a first partial result set; and
     ingesting the first partial result set by a next operation in a query pipeline.

2. The system of claim 1, wherein the operations further comprise assigning a portion of a dictionary to each worker thread, of a plurality of worker threads, performing the multi-fragment index scan operation, the dictionary mapping unique data values in a column to one or more corresponding value identifiers.

3. The system of claim 2, wherein the operations further comprise assigning each worker thread equally-sized data value ranges from the dictionary.

4. The system of claim 2, wherein the operations further comprise assigning each worker thread different and non-overlapping portions of the dictionary.

5. The system of claim 2, wherein each worker thread operates independently on an assigned portion of the dictionary across the plurality fragments of the database table, and wherein the merging of the plurality of partial result sets from each fragment of the database table is performed independently of other fragments.

6. The system of claim 1, wherein the operations further comprise combining the multi-fragment index scan operation with one or more filters.

7. The system of claim 6, wherein the operations further comprise omitting, based at least on a plurality of data values excluded by the one or more filters, one or more corresponding value identifiers from a subsequent index lookup.

8. The system of claim 1, wherein the operations further comprise continuing to perform the multi-fragment index scan operation using the chunk-at-a-time on each of the fragments of the plurality of fragments, wherein the continuing comprises:

generating at least a third chunk of the first fragment of the plurality of fragments and a fourth chunk of the second fragment of the plurality of fragments, merging at least the third chunk of the first fragment of the plurality of fragments and the fourth chunk of the second fragment of the plurality of fragments to generate a second partial result set, and ingesting the second partial result set by another operation in the query pipeline.

9. The system of claim 1, wherein the multi-fragment index scan operation comprises generating, based at least on a dictionary mapping unique data values in a dictionary-compressed column of the database table to one or more corresponding value identifiers, a value identifier set in which each value identifier is ordered in accordance with a corresponding data value.

10. The system of claim 9, wherein performing the multi-fragment index scan operation further comprises performing an index lookup to retrieve row positions of each value identifier in the value identifier set.

11. A computer-implemented method, comprising:

performing, on each fragment of a plurality of fragments of a database table, a multi-fragment index scan operation using a chunk-at-a-time on each of the fragments of the plurality of fragments, wherein the multi-fragment index scan operation using the chunk-at-a-time generates at least a first chunk of a first fragment of the plurality of fragments and a second chunk of the second fragment of the plurality of fragments;

merging a plurality of partial results output from the multi-fragment index scan operation performed on at least the first chunk of the first fragment of the plurality of fragments and the second first chunk of the second fragment of the plurality of fragments to generate a first partial result set; and ingesting the first partial result set by a next operation in a query pipeline.

12. The method of claim 11, further comprising assigning a portion of a dictionary to each worker thread, of a plurality of worker threads, performing the multi-fragment index scan operation, the dictionary mapping unique data values in a column to one or more corresponding value identifiers.

13. The method of claim 12, further comprising assigning each worker thread equally-sized data value ranges from the dictionary.

14. The method of claim 12, wherein each worker thread operates independently on an assigned portion of the dictionary across the plurality fragments of the database table, and wherein the merging of the plurality of partial result sets from each fragment of the database table is performed independently of other fragments.

15. The method of claim 11, further comprising combining the multi-fragment index scan operation with one or more filters.

16. The method of claim 15, further comprising omitting, based at least on a plurality of data values excluded by the one or more filters, one or more corresponding value identifiers from a subsequent index lookup.

17. The method of claim 11, further comprising continuing to perform the multi-fragment index scan operation using the chunk-at-a-time on each of the fragments of the plurality of fragments, wherein the continuing comprises:

generating at least a third chunk of the first fragment of the plurality of fragments and a fourth chunk of the second fragment of the plurality of fragments, merging at least the third chunk of the first fragment of the plurality of fragments and the fourth chunk of the second fragment of the plurality of fragments to generate a second partial result set, and ingesting the second partial result set by another operation in the query pipeline.

18. The method of claim 11, wherein performing the multi-fragment index scan operation comprises generating, based at least on a dictionary mapping unique data values in a dictionary-compressed column of the database table to one or more corresponding value identifiers, a value identifier set in which each value identifier is ordered in accordance with a corresponding data value.

19. The method of claim 18, wherein performing the multi-fragment index scan operation further comprises performing an index lookup to retrieve row positions of each value identifier in the value identifier set.

20. A non-transitory computer readable medium storing instructions, which when executed by at least one data processor, result in operations comprising:

performing, on each fragment of a plurality of fragments of a database table, a multi-fragment index scan operation using a chunk-at-a-time on each of the fragments of the plurality of fragments, wherein the multi-fragment index scan operation using the chunk-at-a-time generates at least a first chunk of a first fragment of the plurality of fragments and a second chunk of the second fragment of the plurality of fragments;

merging a plurality of partial results output from the multi-fragment index scan operation performed on at least the first chunk of the first fragment of the plurality of fragments and the second first chunk of the second fragment of the plurality of fragments to generate a first partial result set; and ingesting the first partial result set by a next operation in a query pipeline.

* * * * *